UNITED STATES PATENT OFFICE.

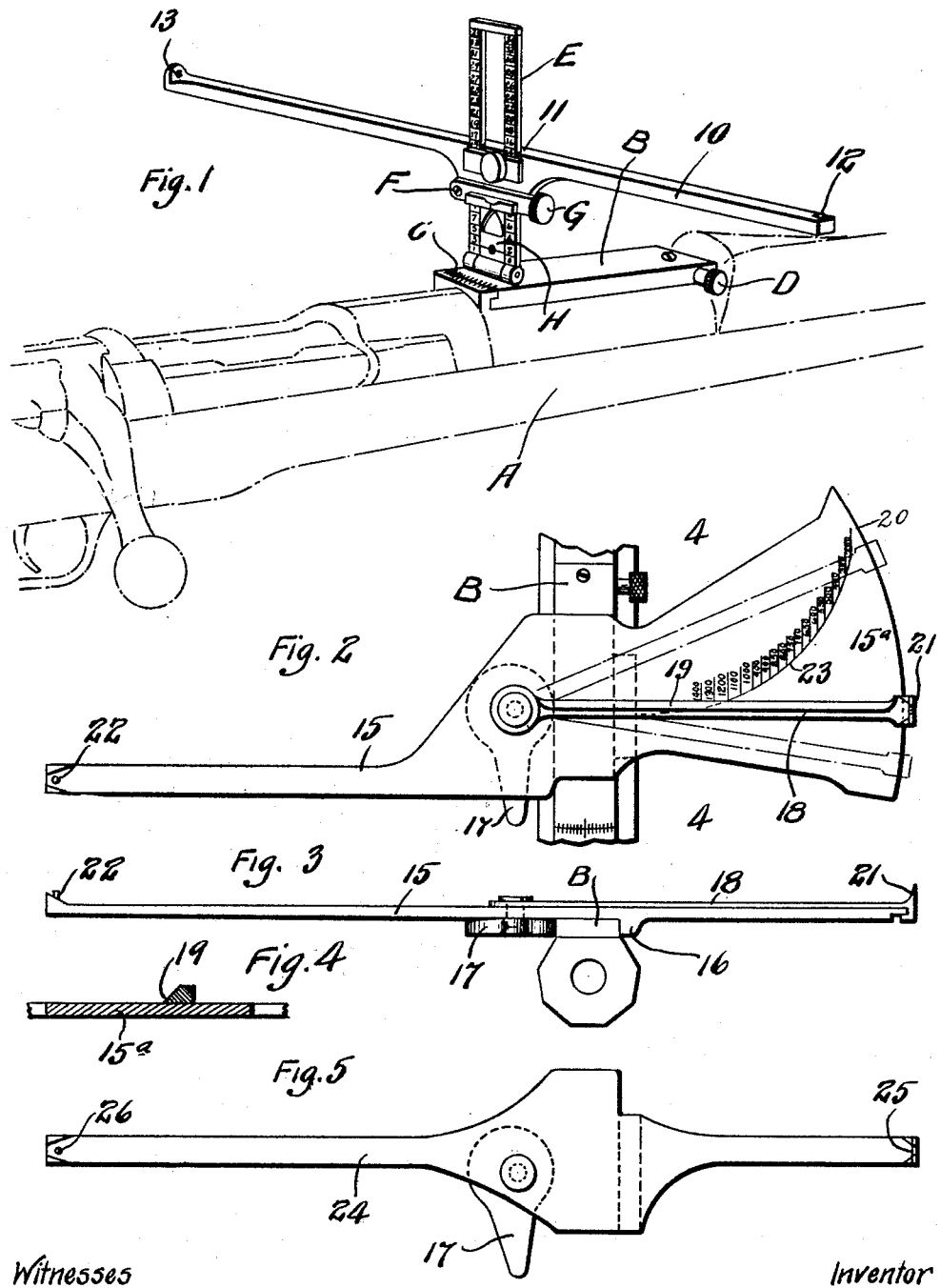

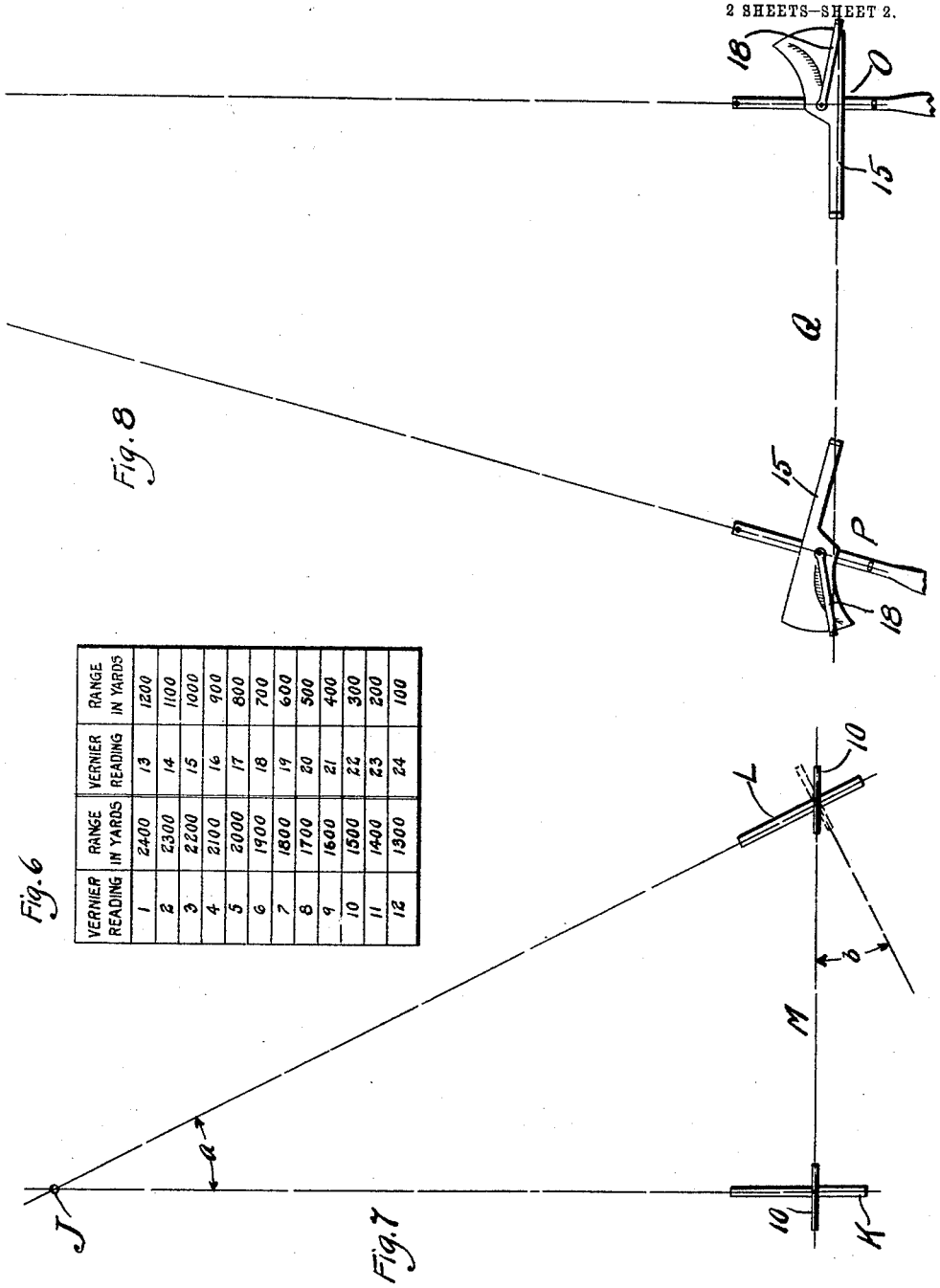

GEORGE R. GUILD, OF THE UNITED STATES ARMY, ASSIGNOR TO DAVID S. GUILD, JR., OF KIRKWOOD, MISSOURI.

RANGE-FINDER FOR SMALL-ARMS.

1,117,999.          Specification of Letters Patent.      Patented Nov. 24, 1914.

Application filed December 31, 1913. Serial No. 809,665.

*To all whom it may concern:*

Be it known that I, GEORGE R. GUILD, an officer of the United States Army, stationed at Texas City, Texas, have invented a certain new and useful Improvement in Range-Finders for Small-Arms, of which the following is a full, clear, and exact description, such as will enable others skilled in the art to which it appertains to make and use the same, reference being had to the accompanying drawings, forming part of this specification, in which—

Figure 1 is a perspective view of a range finder of my improved construction, the same being applied to the hinged leaf of a sighting device of a rifle. Fig. 2 is a plan view of a modified form of the range finder. Fig. 3 is an elevational view of the form of range finder shown in Fig. 2. Fig. 4 is an enlarged cross sectional view taken approximately on the line 4—4 of Fig. 2. Fig. 5 is a plan view of a modified form of the range finder. Fig. 6 is an elevational view of a card or plate containing a chart or table which is utilized in connection with the forms of range finders seen in Figs. 1 and 5. Fig. 7 is a diagrammatic view illustrating the use of the forms of range finders illustrated in Figs. 1 and 5. Fig. 8 is a diagrammatic view illustrating the use of the form of range finder shown in Fig. 2.

My invention relates to new and useful improvements in range finders for small arms, the principal object of my invention being to provide a comparatively small, simple, and inexpensive device which can be attached to any rifle which is specially designed for use in connection with rifles now in general use in the United States Army, and which range finder in conjunction with the rifle or arm to which it is applied furnishes simple means for accurately determining the range or distance in yards from the user of the rifle to the object desired to be hit.

My invention consists of a bar provided at one end with a front sight, and at the opposite end with a rear sight (fixed or movable), and which bar is adapted to be rigidly attached to a rifle at right angles to the line of sight of said rifle, and means provided so that said bar or a portion of it may be deflected through an angle preferably in a plane formed by the line of sight of the rifle and the line of sight of the device.

The means for deflecting the device may be the movable base of the windage device on the rifle or by a movable arm attached to the bar itself. Where the bar is used with the usual windage device of a rifle, the angular deflection of said bar is read on the windage scale of the rifle, and which reading is utilized in connection with a table, which latter is constructed by experiment for a given base line in yards. Where the windage of the rifle is not used, as a basis for finding the range, the bar of the range finder is provided with a movable arm, one edge of which overlies and intersects a plotted curved, and which latter is formed in any suitable manner on top of the bar.

With the above and other objects in view, my invention consists in certain novel features of construction, and arrangement of parts, hereinafter more fully described and claimed.

Referring to the form of device illustrated in Fig. 1, A designates the rifle barrel; B, the movable base of the rifle sight; C, the vernier; D, the thumb screw for swinging the base laterally so that the vernier can be read; E, the leaf which is hinged to the base B; F, the slide; G, the slide screw, and H, the drift slide, all of which parts are of well known construction and form no part of my invention.

My improved range finder used in connection with the sighting device just described, comprises a straight bar 10, preferably of metal, the central portion of which is provided with a bearing 11, which receives the leaf E, and said bar is mounted on said leaf and is adapted to move vertically thereupon with the slide F. Formed on top of the bar at one end is a front sight 12 and at the rear end is a rear sight 13, the same being preferably in the form of a peep sight, that is, a small aperture formed through an upright lug.

Referring now to Figs. 6 and 7, I will describe the operation and use of my improved range finder. The table illustrated in Fig. 6 contains two columns of figures, one for the vernier readings and the other for the range in yards. This table is made up by experiment for a given base line in yards, in connection with the number of divisions on the vernier of the windage scale. Assuming that J is the object the range of which is to be found, a rifle K carrying one of my improved range finders is sighted at said object, and a second rifle L provided with one of the range finders is located at a predetermined distance away from rifle K, for instance, one hundred yards, and this second rifle is sighted upon object J. The base line M of one hundred yards between rifles is at right angles to the line of sight from rifle K to object J, this base line being ascertained by sighting through the sights of range finder 10 on rifle K. The range finder on rifle L is normally at right angles to the line of sight from said last mentioned rifle to the object J, and after rifle L has been properly positioned, its range finder is shifted so that it occupies a position in direct alinement with the range finder of rifle K. This shifting movement is brought about by manipulating the thumb screw D to actuate the base B rifle L, and which base carries the leaf E on which the corresponding bar 10 is mounted. After the bar 10 on rifle L has been moved so that it occupies a position in direct alinement with the bar of rifle K, the operator notes the deflection of the shifted base B by means of the vernier C, and then returns to the chart or table and notes thereon the range in yards opposite the vernier reading. This gives the range of object J from rifle K and the drift slide H on the sighting device of rifle K can now be elevated to the proper mark on leaf E so that this rifle can be properly trained on object J. The range angle $a$, Fig. 7, and vernier angle $b$ are always equal to each other, and as the range increases angle $a$ correspondingly decreases, and hence angle $b$ decreases and the vernier readings become correspondingly smaller.

The form of range finder illustrated in Figs. 2 and 3 comprises a bar 15, one end of which is widened to form a plate $15^a$. Formed on or fixed to the underside of this bar is a lug 16, and pivotally mounted on said bar adjacent to said lug is an eccentric latching device 17, which together with the lug, provides means for locking the bar to the base B of the sighting device of a rifle. Pivotally mounted on top of the plate $15^a$ is an arm 18 having a knife edge 19 and the outer end of this arm is adapted to traverse the curved edge 20 at the outer end of plate $15^a$, and this outer end of said arm is provided with a peep sight 21. Formed on the end of the bar 15 opposite from the plate $15^a$ is a sight 22. Formed in any suitable manner on top of the plate $15^a$ is a curve 23, and immediately adjacent thereto is a series of division marks which are numbered to form a scale. This scale is for the purpose of indicating the range in yards. The curve 23 may be plotted mathematically by figuring with a known range and known base the distance from the front sight 22 to any point on the bar along the line of sight on said bar when the rear sight 21 is sighted at zero, or said curve may be plotted experimentally by setting up the instrument and working with known yards in connection with a known base line.

Referring now to Fig. 8, I will describe the manner in which this form of range finder is used. A rifleman at point O with a range finder applied to his rifle at right angles to the barrel, aims at the distant object and with the arm of said range finder set at zero, point P is located a certain distance away from rifle O, which distance may be one hundred yards. This gives a base line Q of one hundred yards in length and at right angles to the line of sight of rifle O toward the object. Point O being marked, the rifle is taken to point P and sighted at the distant object, and the range finder is reversed in position on said rifle. The arm 18 on said range finder is now swung upon its pivot point until by sighting through the sights 21 and 22 of the range finder at point P, point O is located and the range is now read off the curve 23 by noting the point of intersection between the knife edge of arm 18 and curve 23. It will be understood that the readings on curve 23 are made for a certain base length, say, one hundred yards, but a base of any length may be used and the readings on the curve reduced to this base. Assuming the base to be one hundred yards and the reading on the curve is twelve hundred, then the true range is twelve hundred yards. Using a base of eighty yards and assuming that the curve was made for a hundred yard base, then to ascertain the true range the reading of twelve hundred on the curve would be multiplied by .8, thus giving a true range of nine hundred sixty yards.

The form of range finder illustrated in Fig. 5 comprises a straight bar 24 provided with a peep sight 25 at one end, and a rear sight 26 at the opposite end, and this bar is adapted to be attached to the base B of the rifle sighting device and to be shifted laterally therewith as the thumb screw D is actuated. This form of device can only be used in connection with a chart such as seen in Fig. 6, and which chart is, as heretofore described, utilized in connection with the form of range finder shown in Fig. 1.

A range finder of my improved construction is comparatively simple and very compact, can be readily placed in position upon or removed from a rifle, and furnishes ready means for accurately determining the ranges for rifles and like small arms.

It will be readily understood that my improved range finder can be varied in size and structure so as to be utilized with the larger types of guns and rifles used on battleships, and coast and field artillery, and the device is also applicable for use in connection with the telescopes of artillery range finders.

I claim:

1. The combination with a fire arm, of sights thereon, one of which is movable, an adjustable range finding bar positioned on the movable sight and arranged substantially at right angles to the fire arm, and sights on said bar, which last mentioned sights are normally positioned on opposite sides of the barrel of the fire arm.

2. The combination with a rifle of a movable sight member thereupon, a range finding bar applied to said rifle, sights on said bar, and means whereby the angularity of the bar with respect to the rifle can be varied.

3. The combination with a rifle provided with the usual sights, and a pivotally mounted transversely adjustable member, of a range finding bar detachably applied to said adjustable member, and sights on said bar.

4. The combination with a rifle provided with the usual sights one of which is movable, of an adjustable bar applied to the movable sight substantially at right angles to the rifle sights, with the ends of said bar on opposite sides of the rifle barrel, and sights on said bar, said bar being capable of angular deflection in a substantial horizontal plane without changing the position of the rifle.

5. The combination with a rifle of the usual sights thereon, an adjustable base for one of said sights, of a range finding bar detachably applied to the adjustable base with the ends of said bar on opposite sides of the rifle barrel, and sights on said range finding bar.

6. The combination with a movable part of the sighting device of a rifle, of a bar detachably applied to said movable part, and sights on said bar.

7. The combination with a rifle provided with the usual sights, of a range finding bar applied to said rifle substantially at right angles to the sights thereof, sights on said bar, means for changing the position of said bar, and the part on which the bar is positioned being provided with indicia for accurately determining the angular deflection of said bar.

8. A range finder for fire arms comprising a member which is adapted to be applied to the barrel of the fire arm substantially at right angles thereto, means on said member whereby the same is clamped to a part of the firearm, sights on said member, which sights are located on opposite sides of the line of sight of the fire arm to which the device is applied.

In testimony whereof I hereunto affix my signature in the presence of two witnesses, this 11th day of December, 1913.

GEORGE R. GUILD.

Witnesses:
 WM. D. FAULKNER,
 R. C. BULL.

Copies of this patent may be obtained for five cents each, by addressing the "Commissioner of Patents, Washington, D. C."